United States Patent
Oohashi

(10) Patent No.: US 7,445,074 B2
(45) Date of Patent: Nov. 4, 2008

(54) CONTROL SYSTEM, CONTROL METHOD, AND CONTROL PROGRAM FOR VEHICLE ENGINE

(75) Inventor: Hideyuki Oohashi, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 0 days.

(21) Appl. No.: 11/380,741

(22) Filed: Apr. 28, 2006

(65) Prior Publication Data

US 2006/0243514 A1 Nov. 2, 2006

(30) Foreign Application Priority Data

Apr. 28, 2005 (JP) ............... 2005-133267

(51) Int. Cl.
    *B60K 28/14* (2006.01)
(52) U.S. Cl. .................................................. 180/282
(58) Field of Classification Search ............... 180/284, 180/282, 271, 773, 272, 273; 340/475; 477/183
    See application file for complete search history.

(56) References Cited

U.S. PATENT DOCUMENTS

| | | | | |
|---|---|---|---|---|
| 3,838,748 | A * | 10/1974 | Gray et al. | 180/273 |
| 6,034,594 | A * | 3/2000 | Gray | 340/440 |
| 6,038,495 | A * | 3/2000 | Schiffmann | 701/1 |
| 6,268,794 | B1* | 7/2001 | Tzanev | 340/475 |
| 6,428,118 | B1* | 8/2002 | Blosch | 303/9.64 |
| 6,584,388 | B2 | 6/2003 | Schubert et al. | 701/46 |
| 6,587,042 | B2 | 7/2003 | Tabata et al. | 340/432 |
| 6,644,454 | B2* | 11/2003 | Yamada et al. | 192/219.1 |
| 6,941,206 | B2* | 9/2005 | Hasegawa et al. | 701/38 |
| 6,961,648 | B2* | 11/2005 | Salib et al. | 701/70 |
| 7,006,901 | B2* | 2/2006 | Wang | 701/1 |
| 7,011,177 | B2* | 3/2006 | Machida et al. | 180/284 |
| 7,096,103 | B2* | 8/2006 | Salib et al. | 701/38 |

(Continued)

FOREIGN PATENT DOCUMENTS

DE 26 24 609 A1 12/1977

(Continued)

OTHER PUBLICATIONS

Official Communication issued in the corresponding European Patent Application No. EP 06 00 8950, mailed on Jul. 4, 2006.

*Primary Examiner*—Kevin Hurley
*Assistant Examiner*—Karen Amores
(74) *Attorney, Agent, or Firm*—Keating & Bennett, LLP

(57) ABSTRACT

An engine control system correctly determines when a vehicle overturns and includes a vehicle inclination angle detector arranged to detect an inclination of a vehicle relative to a horizontal plane, a cumulative-duration-of-inclination detector arranged to detect a cumulative duration for which an inclination angle detected by the vehicle inclination angle detector is greater than a predetermined angle, a rider's operation detector arranged to detect whether or not a rider is operating the vehicle, and an engine cut off device arranged to stop an engine of the vehicle when it has been determined that the vehicle has overturned, based on an output of the cumulative-duration-of-inclination detector indicating the cumulative duration for which the inclination angle detected by the vehicle inclination angle detector is greater than the predetermined angle, and an output of the rider's operation detector indicating that the rider is operating the vehicle.

18 Claims, 5 Drawing Sheets

U.S. PATENT DOCUMENTS

| | | | |
|---|---|---|---|
| 7,124,016 B2 * | 10/2006 | Kakinuma | 701/112 |
| 7,124,852 B2 * | 10/2006 | Hasegawa | 180/282 |
| 7,224,263 B2 * | 5/2007 | Maehara | 340/429 |
| 2002/0027037 A1 * | 3/2002 | Yamamoto et al. | 180/283 |
| 2002/0039951 A1 * | 4/2002 | Hasegawa | 477/183 |
| 2003/0109939 A1 * | 6/2003 | Burgdorf et al. | 700/38 |
| 2004/0050609 A1 * | 3/2004 | Machida et al. | 180/282 |
| 2004/0167701 A1 * | 8/2004 | Mattson et al. | 701/71 |
| 2005/0143900 A1 * | 6/2005 | Kantschar et al. | 701/111 |
| 2005/0154521 A1 * | 7/2005 | Katsuragawa et al. | 701/101 |
| 2005/0267668 A1 * | 12/2005 | Otsuji | 701/101 |
| 2006/0095181 A1 * | 5/2006 | Darvish | 701/38 |
| 2006/0113139 A1 * | 6/2006 | Nishi et al. | 180/273 |
| 2006/0149453 A1 * | 7/2006 | Kuragaki et al. | 701/70 |
| 2007/0075533 A1 * | 4/2007 | Makabe et al. | 280/735 |

FOREIGN PATENT DOCUMENTS

JP  64-028086 A  1/1989

* cited by examiner

CONTROL SYSTEM, CONTROL METHOD, AND CONTROL PROGRAM FOR VEHICLE ENGINE

BACKGROUND OF THE INVENTION

1. Field of the Invention

The present invention relates to a control system, a control method, and a control program for a vehicle engine that detects inclination of the vehicle at an angle greater than a predetermined angle and executes engine control.

2. Description of Related Art

The following art is known to ensure the safety of a vehicle when the vehicle is inclined at an angle greater than a predetermined angle. JP-A-Sho 64-28086 discloses, as a device that immediately cuts off an electrical system in an emergency for the safety of the motorcycle, a safety device for a motorcycle, including a rider detector for detecting the presence or absence of the rider on a rider's seat of the motorcycle, and an overturning detector for detecting when the motorcycle has overturned, in which when the overturning detector detects that the motorcycle has overturned and the rider detector detects the absence of the rider, a power feed line of the motorcycle is cut off.

In JP-A-Sho 64-28086, both an output of an inclination angle sensor and an output of the rider detector mounted to the seat are requirements for cutting off the power feed line. Thus, when the vehicle swings significantly at the time of running on a rough terrain, for example, the inclination angle sensor might not function normally and can erroneously detect that the motorcycle has overturned even when the motorcycle has not overturned. Also, when the rider is riding the motorcycle while standing on pedals, the rider detector may erroneously determine that the rider is absent so that the power feed line is cut off.

Further, the rider is not always thrown off at the time of the motorcycle overturning. Thus, the power feed line might not be cut off when the motorcycle is overturned.

SUMMARY OF THE INVENTION

In order to overcome the problems described above, preferred embodiments of the present invention provide a control system, a control method, and a control program for a vehicle engine that are capable of stopping the engine of the vehicle independently of the case in which the vehicle swings significantly at the time of running on a rough terrain, for example, or of the state in which the rider rides the vehicle.

According to a preferred embodiment of the present invention, an engine control system includes a vehicle inclination angle detector arranged to detect an inclination of a vehicle relative to a horizontal plane, a first cumulative-duration-of-inclination detector arranged to detect the cumulative duration for which an inclination angle detected by the vehicle inclination angle detector is greater than a predetermined angle, a rider's operation detector arranged to detect whether or not a rider is operating the vehicle, and an engine cut off device arranged to stop an engine of the vehicle when an overturning of the vehicle has been determined based on an output of the first cumulative-duration-of-inclination detector and an output of the rider's operation detector.

According to another preferred embodiment of the present invention, an engine control system includes a vehicle inclination angle detector arranged to detect an inclination of a vehicle relative to a horizontal plane, a first cumulative-duration-of-inclination detector arranged to detect a first cumulative duration for which an inclination angle detected by the vehicle inclination angle detector is greater than a predetermined angle, a second cumulative-duration-of-inclination detector arranged to detect a second cumulative duration that is set to be longer than the first cumulative duration, a rider's operation detector arranged to detect whether or not a rider is operating the vehicle, a first engine cutoff device arranged to stop an engine of the vehicle when an overturning of the vehicle has been determined based on an output of the first cumulative-duration-of-inclination detector and an output of the rider's operation detector, and a second engine cutoff device arranged to stop the engine of the vehicle when the overturning of the vehicle has been determined based on an output of the second cumulative-duration-of-inclination detector.

The first and second cumulative-duration-of-inclination detectors preferably are an up-down counter that is incremented when an angle detected by the vehicle inclination angle detector is greater than a predetermined angle, and is decremented when an angle detected by the vehicle inclination angle detector is smaller than the predetermined angle.

The rider's operation detector detects at least one of throttle opening, pressure within an intake pipe, braking, and braking and shifting of the vehicle that respond to the rider's operation.

The engine cut off devices stops at least one of ignition of the engine, fuel injection, and a fuel pump.

Various preferred embodiments of the present invention are preferably directed to a vehicle equipped with the engine control system. It is specifically preferable that the engine control system be mounted on a motorcycle or a small vehicle designed for all terrains.

According to another preferred embodiment of the present invention, an engine control method includes the steps of detecting an inclination of a vehicle, detecting a cumulative duration for which the inclination angle is greater than a predetermined angle, detecting whether or not a rider is operating the vehicle, and stopping an engine of the vehicle when an overturning of the vehicle has been determined based on an output indicating the cumulative duration and whether the rider is operating the vehicle.

According to another preferred embodiment of the present invention, an engine control method includes the steps of detecting an inclination of a vehicle, detecting a cumulative duration for which the inclination angle is greater than a predetermined angle, detecting a second cumulative duration for which the inclination angle is greater than a predetermined angle and that is set to be longer than the first cumulative duration, detecting whether or not a rider is operating the vehicle, stopping an engine of the vehicle when an overturning of the vehicle has been determined based on an output indicating the first cumulative duration and an output indicating whether or not the rider is operating the vehicle, and stopping the engine of the vehicle when an overturning of the vehicle has been determined based on an output indicating the second cumulative duration of inclination.

The steps of detecting the first and second cumulative durations include incrementing an up-down counter when the inclination angle of the vehicle is greater than a predetermined angle and decrementing the up-down counter when the inclination angle of the vehicle is smaller than the predetermined angle.

According a further preferred embodiment of the present invention, an engine control program for a vehicle includes a vehicle inclination angle detector arranged to detect an inclination of a vehicle, a first cumulative-duration-of-inclination detector arranged to detect a first cumulative duration for which an inclination angle detected by the vehicle inclination angle detector is greater than a predetermined angle, a second cumulative-duration-of-inclination detector arranged to detect a second cumulative duration for which the inclination angle detected by the vehicle inclination angle detector is greater than a predetermined angle and that is set to be longer than the first cumulative duration, a rider's operation detector arranged to detect whether or not a rider is operating the vehicle, a first engine cut off device arranged to stop an engine of the vehicle when an overturning of the vehicle has been determined based on an output of the first cumulative-duration-of-inclination detector and an output of the rider's operation detector, a second engine cut off device arranged to stop the engine of the vehicle when an overturning of the vehicle has been determined based on an output of the second cumulative-duration-of-inclination detector, and an electronic control unit, in which a computer of the electronic control unit executes the steps of one of the methods described above.

At least one of the preferred embodiments of the present invention includes a cumulative-duration-of-inclination detector arranged to detect that the inclination angle of the vehicle is maintained at an angle greater than a predetermined angle for a predetermined cumulative duration, and a rider's operation detector arranged to detect that the rider is operating the vehicle by his/her will. The cumulative-duration-of-inclination detector and the rider's operation detector allow for an accurate and true detection of the vehicle overturning so that the engine of the vehicle is stopped. More specifically, the overturning of the vehicle is determined based on inclination of the vehicle and whether or not the rider is operating the vehicle by his/her will. This allows for correct and accurate determination of the vehicle overturning.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

With reference to FIGS. 1 through 5(b), description will be hereinafter made of a control system, a control method, and a control program for a vehicle engine according to various preferred embodiments of the present invention.

Figure 1:
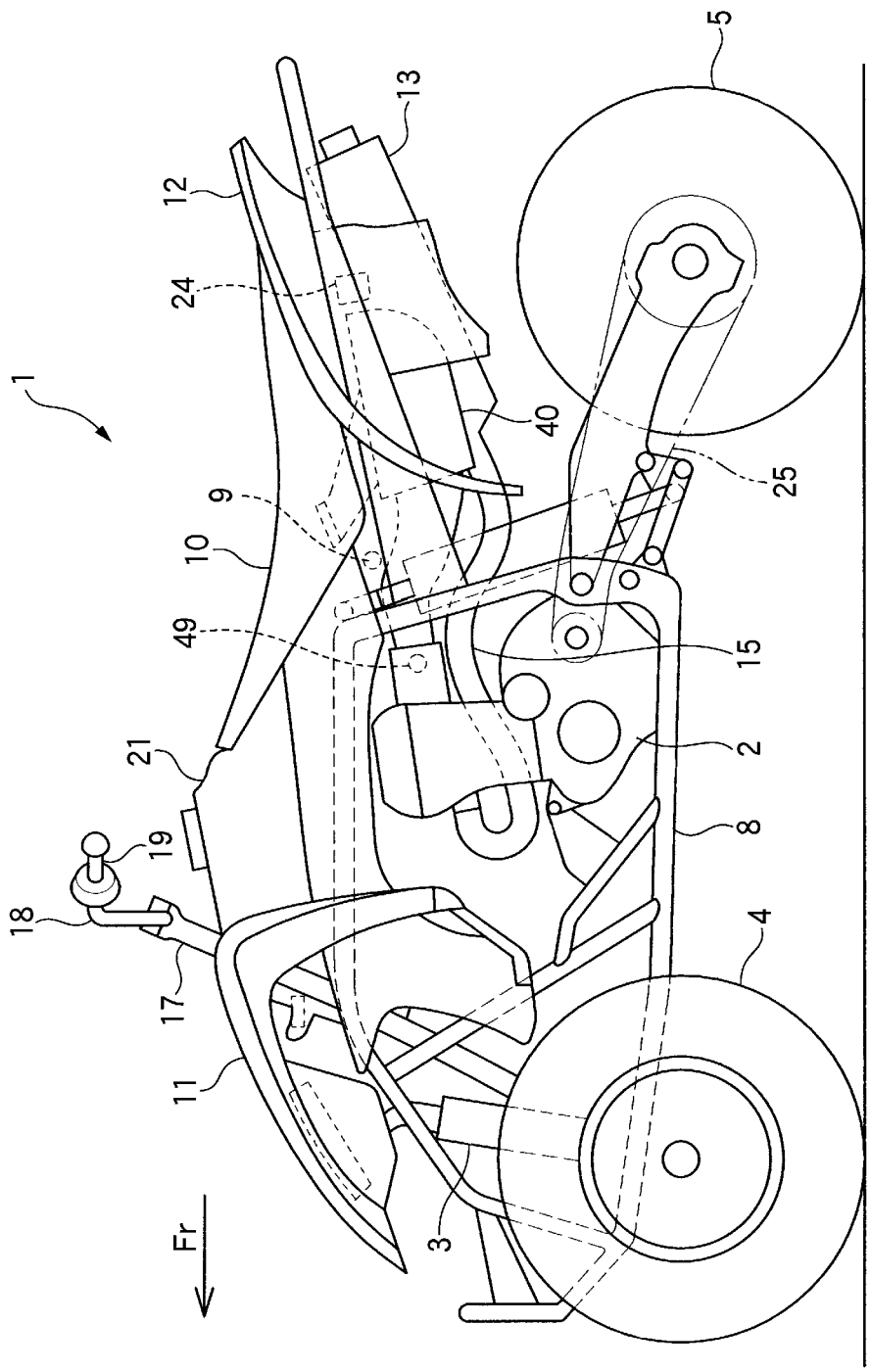
FIG. 1 is a left side view of an all-terrain vehicle as an example of a vehicle to which a preferred embodiment of the present invention is applied.

FIG. 1 is a left side view of an all-terrain vehicle as an example of a vehicle to which various preferred embodiments of the present invention is applied.

In a vehicle 1, front suspensions 3 are disposed forward in the direction that the vehicle travels (direction shown by Fr in FIG. 1) and on the left and right sides in the lateral direction of the vehicle. A front wheel 4 is rotatably supported at the lower end of the front suspension 3.

Front fenders 11 are provided above the left and right front wheels 4. The upper end of the front suspension 3 is supported by a body frame 8.

The front end of the body frame 8 in the direction that the vehicle travels supports a steering shaft 17 so as to be rotatable leftward and rightward. A handlebar 18, at a central portion thereof, is supported at the upper end of the steering shaft 17 and extends leftward and rightward from the central portion. Grips 19 are preferably provided at both ends of the handlebar 18. A throttle lever is attached inside of the right grip in the lateral direction of the vehicle so that a rider can operate the throttle lever by depressing with his/her finger during running of the vehicle.

An exhaust pipe 15 is connected to a front portion of an engine 2, and extends forward from the engine and is bent in a substantially U-shaped configuration and then extends rearward in the direction that the vehicle travels. The rear end of the exhaust pipe is connected to a silencer 13. Exhaust gas discharged from the engine flows through the exhaust pipe and is discharged from the rear of the silencer 13. Drive power outputted from the engine is transmitted to rear wheels 5 via a chain mechanism 25. Rear fenders 12 are provided above the left and right rear wheels 5. An upper portion of the engine is suspended on the body frame 8, while a lower portion of the engine is supported with the body frame 8.

A seat 10 is supported by the body frame 8. A fuel tank 21 is disposed in front of the seat 10 and supported by the body frame 8.

An intake system 40 is disposed below the seat 10 to deliver air to the engine.

There are provided a throttle opening sensor 49, which responds to the rider's operation of the throttle lever on the right side of the handlebar, an inclination angle sensor 9 arranged to detect an inclination angle of the vehicle relative to a horizontal plane, and an ECU 24 arranged to execute engine control.

Figure 2:
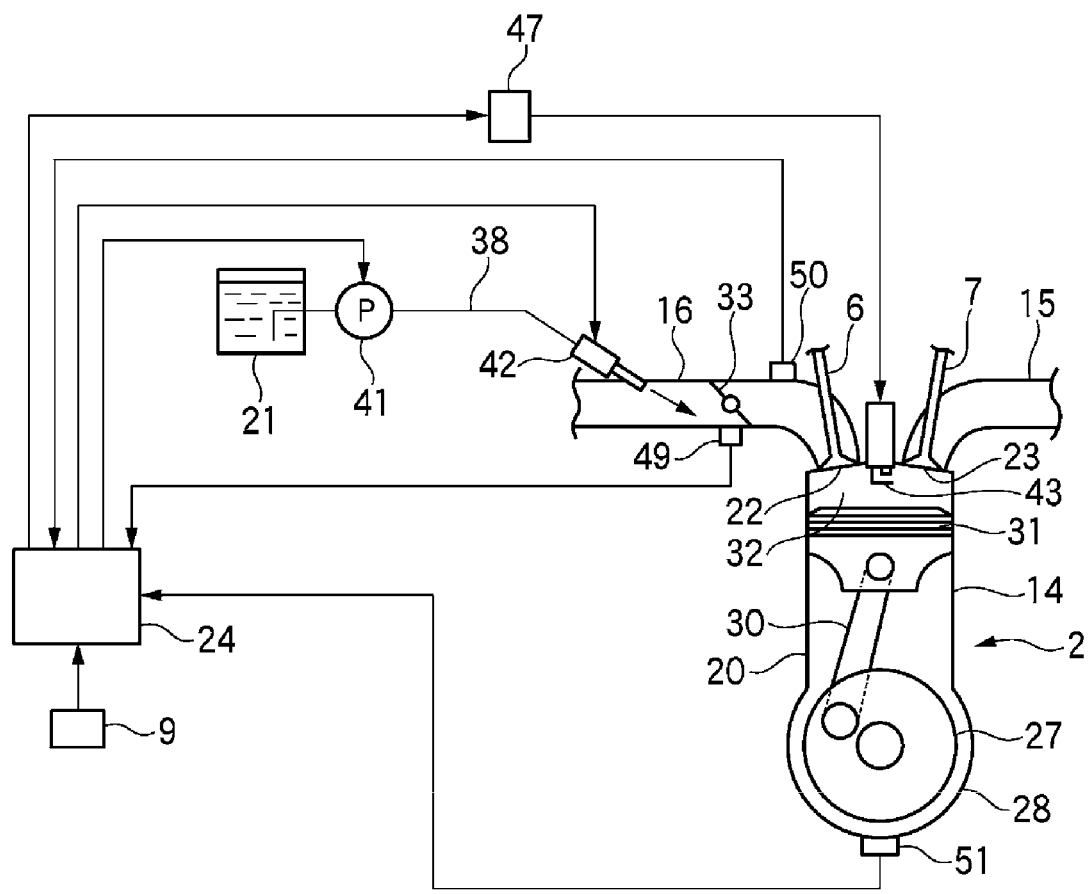
FIG. 2 illustrates the relationships between elements of an engine control system according to a preferred embodiment of the present invention and an engine.

FIG. 2 illustrates the relationships between elements of the engine control system according to a preferred embodiment of the present invention and the engine.

In FIG. 2, the engine 2 preferably includes an engine body 14 including a cylinder 20, an intake pipe 16, and the exhaust pipe 15. The engine 2 in this preferred embodiment is preferably a single-cylinder, four-stroke engine. However, the engine 2 may be a multi-cylinder, four-stroke engine or other type of engine.

As shown in FIG. 2, a piston 31 is received in the cylinder 20 of the engine body 14. The piston 31 is coupled to one end of a connecting rod 30, with the other end of the connecting rod 30 being coupled to a crank 27 inside a crankcase 28. A top portion of the cylinder 20 preferably has an intake port 22 and an exhaust port 23. The intake port 22 is connected to the intake pipe 16, and the exhaust port 23 is connected to the exhaust pipe 15. The intake port 22 is provided with an intake valve 6, and the exhaust port 23 is provided with an exhaust valve 7. A combustion chamber 32 is defined in the cylinder 20, above the piston 31. A spark plug 43 is disposed in the combustion chamber 32, and is connected to an ignition coil 47.

Inside the intake pipe 16, there is provided a throttle valve 33 such that the opening of the valve is controlled in response to an accelerator opening. An injector 42 is attached to the intake pipe 16, upstream from the throttle valve 33. The injector 42 is connected to a fuel pipe 38, which in turn is connected to the fuel tank 21. The fuel pipe 38 is provided with a fuel pump 41. The fuel pump 41 is illustrated being disposed outside the fuel tank 21 in FIG. 2, but the fuel pump 41 can be disposed inside the fuel tank 21.

The injector 42 is attached upstream from the throttle valve 33, but can be attached downstream from the throttle valve 33.

Next, description will be made of various sensors. The engine 2 is provided with a crank angle sensor 51, an intake pipe pressure sensor 50, and the throttle opening sensor 49. The crank angle sensor 51 is a sensor that detects a rotational angle of a crankshaft 46, namely, position of the crank (crank phase). The intake pipe pressure sensor 50 is a sensor that detects a pressure within the intake pipe 16. The throttle opening sensor 49 is a sensor that detects an opening of the throttle valve 33.

In the engine control system according to a preferred embodiment of the present invention, outputs of the crank angle sensor 51, the intake pipe pressure sensor 50, the throttle opening sensor 49, and the inclination angle sensor 9 are connected to the ECU 24, as shown in FIG. 2. The ECU 24 receives a crank angle signal, an intake pipe pressure signal, a throttle opening output signal, and an inclination angle output signal, respectively, from the crank angle sensor 51, the intake pipe pressure sensor 50, the throttle opening sensor 49, and the inclination angle sensor 9, and outputs control signals to the fuel pump 41, the injector 42, the ignition coil 47, and the like.

Figure 3:
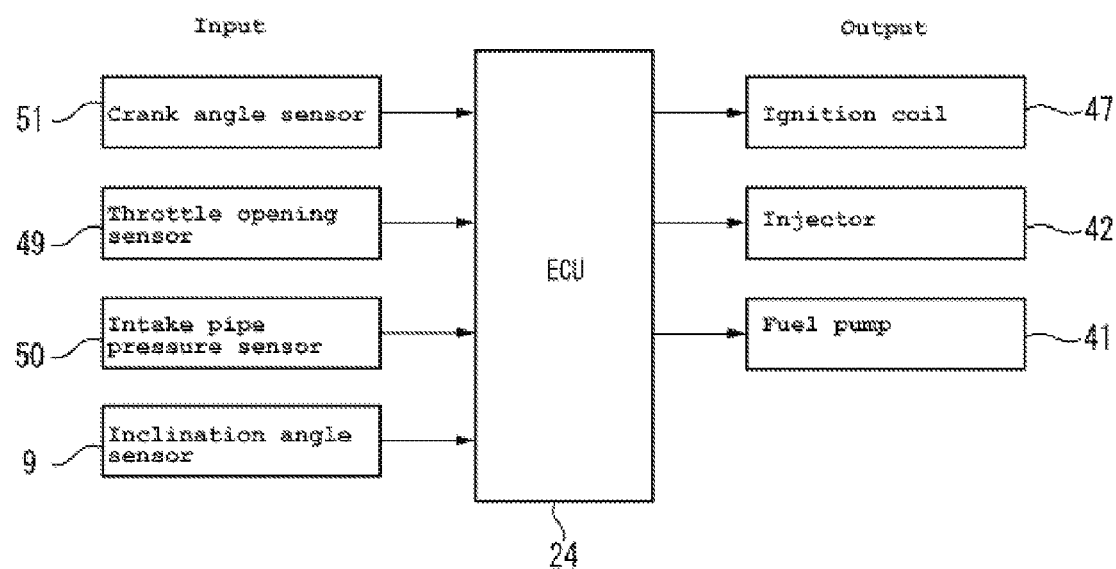
FIG. 3 illustrates the relationships between inputs to and outputs from an ECU mounted on the vehicle of FIG. 1.
Figure 4:
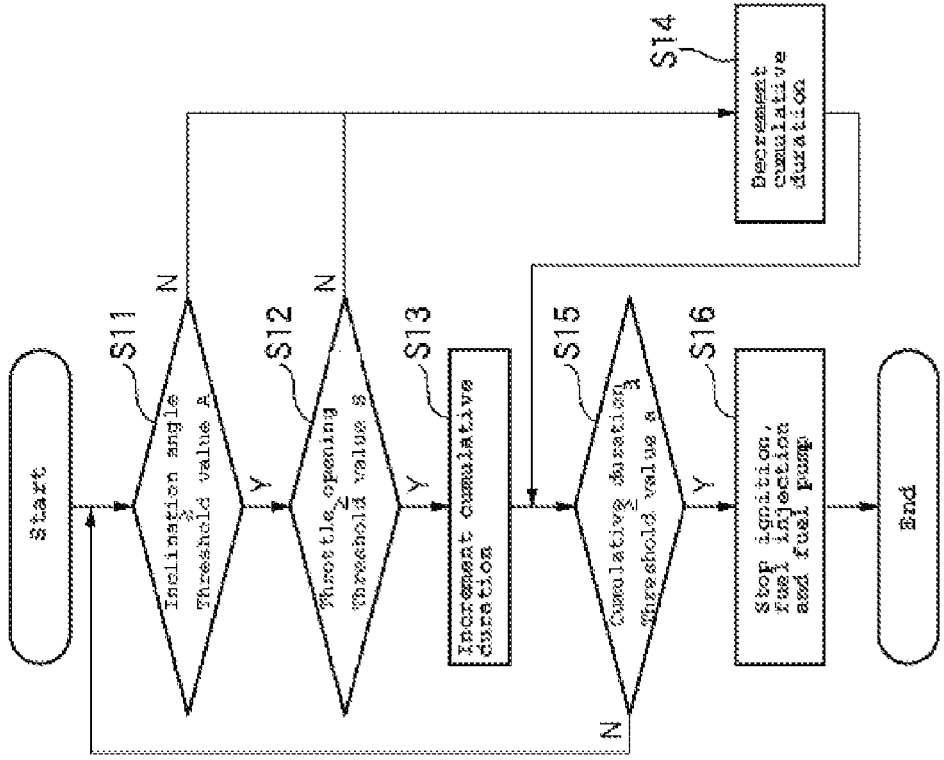
FIGS. 4(a) and 4(b) are flowcharts illustrating the operations of a first preferred embodiment and a second preferred embodiment of the engine control system of the present invention at the time of detecting the overturning of the vehicle.
Figure 4:
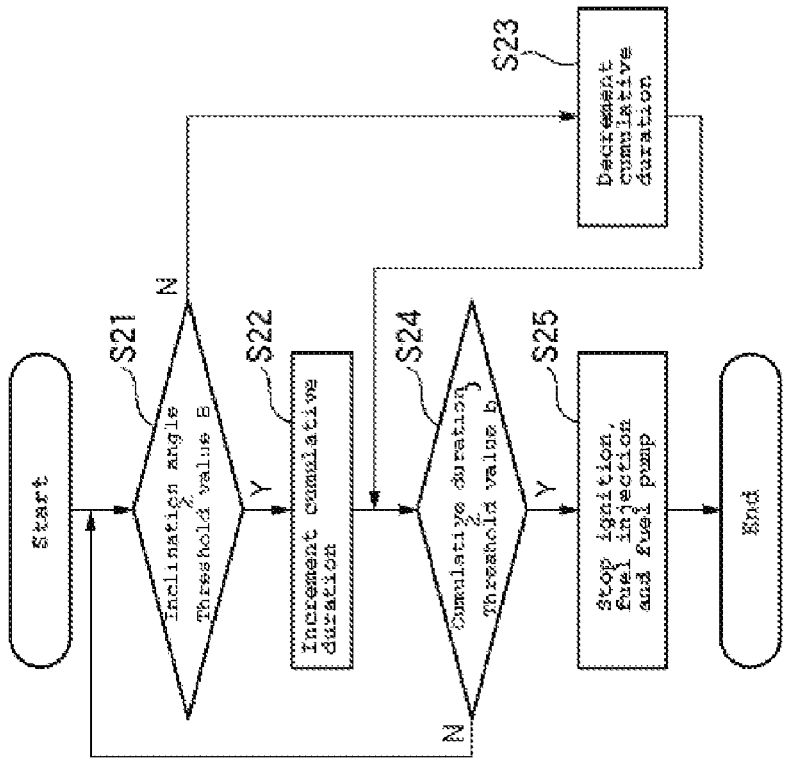

Of the inputs to and the outputs from the ECU (electronic control unit) 24, shown in FIGS. 1 and 2, for executing engine control, those related to the engine control system according to a preferred embodiment of the present invention are illustrated in FIG. 3.

Next, description will be made of the operation of a first preferred embodiment of the engine control system according to the present invention at the time of detecting overturning of the vehicle, with reference to FIG. 4(a).

It is determined for every predetermined period of time (e.g., approximately 10 ms) whether or not an inclination angle detected by the inclination angle sensor 9, attached to the vehicle, is greater than a threshold value A (e.g., about 65 degrees) (step S11).

If the determination in the step S11 is Y, it is then determined whether or not an output of the throttle opening sensor defining a rider's operation detector arranged to detect whether or not the rider is operating the vehicle, is smaller than a threshold value S (step S12).

When Y is determined in the step S12, a determination is made that the throttle valve is nearly closed and the throttle lever is not being operated by the rider by his/her will.

If the determination in the step S12 is Y, an up-down counter defining a first cumulative-duration-of-inclination detector is incremented (step S13).

If the determination in the step S12 is N, the up-down counter defining the first cumulative-duration-of-inclination detector is decremented (step S14).

It is determined whether or not a first cumulative duration, namely, the count value of the up-down counter is greater than a threshold value "a" (step S15).

If the determination in the step S15 is Y, at least one of ignition, fuel injection, and the fuel pump is stopped to stop the engine (step S16).

If the determination in the step S15 is N, the process returns to the step S11 and repeatedly executes the above-described steps.

Description will be next made of the operation of a second preferred embodiment of the engine control system according to the present invention at the time of detecting the overturning of the vehicle, with reference to FIG. 4(b).

It is determined for every predetermined period of time (e.g., approximately 10 ms) whether or not an inclination angle detected by the inclination angle sensor 14, attached to the vehicle, is greater than a threshold value B (e.g., about 65 degrees) (step S21).

If the determination in the step S21 is Y, an up-down counter defining a second cumulative-duration-of-inclination detector is incremented (step S22).

If the determination in the step S21 is N, the up-down counter defining the second cumulative-duration-of-inclination detector is decremented (step S23).

The second cumulative-duration-of-inclination detector has a configuration that is different from the first cumulative-duration-of-inclination detector, and a threshold value "b" of the cumulative duration is set to be greater than the threshold value "a."

It is determined whether or not a second cumulative duration, namely, the count value of the up-down counter is greater than the threshold value "b" (step S24).

If the determination in the step S24 is Y, at least one of ignition, fuel injection, and the fuel pump is stopped to stop the engine (step S25).

If the determination in the step S24 is N, the process returns to the step S21 and repeatedly executes the above-described steps.

In the engine control system according to the second preferred embodiment of the present invention shown in FIG. 4(b) is preferably practiced in combination with the first preferred embodiment shown in FIG. 4(a).

However, the first preferred embodiment shown in FIG. 4(a) can be practiced alone.

The threshold value A and the threshold vale B of the inclination angle can be either the same value or a different value.

Next, description will be made of the operation of the first preferred embodiment of the engine control system according to the present invention described above at the time of detecting the overturning of the vehicle, with reference to a time chart of FIG. 5(a).

Figure 5A:
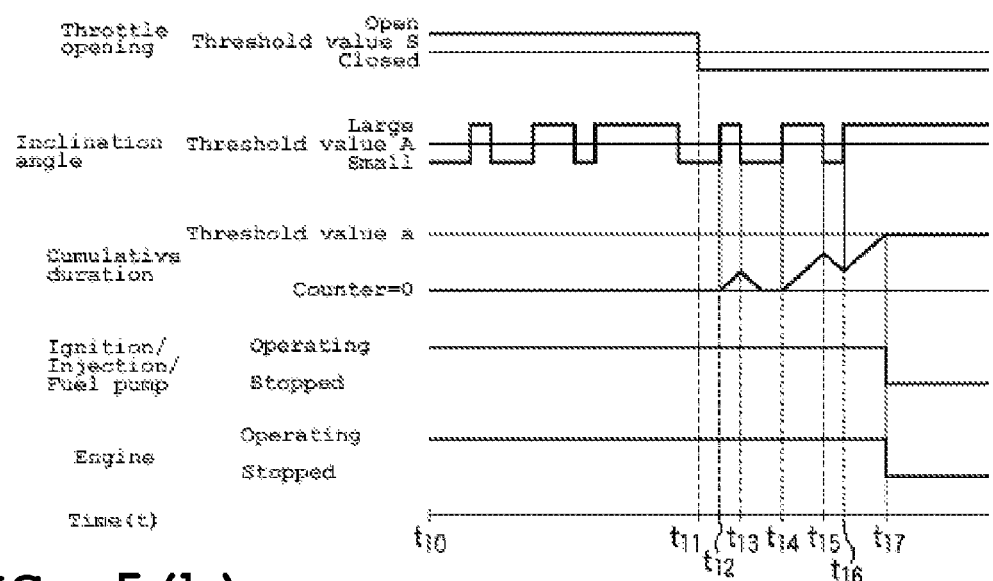
FIGS. 5(a) and 5(b) are time charts illustrating the operations of the first and second preferred embodiments of the engine control system of the present invention at the time of detecting the overturning of the vehicle.

FIG. 5(a) shows throttle openings, inclination angles of the vehicle relative to the horizontal plane, count values of the up-down counter of cumulative duration, the states of ignition, fuel injection and the injection pump, and the states of the engine, with a lapse of time on a horizontal axis.

During the period between time t10 and time t11, the throttle opening is greater than the threshold value S, more specifically, it is determined that the rider is operating the vehicle normally. Accordingly, even when the inclination angle of the vehicle becomes greater than the threshold value A, the up-down counter is not incremented.

At time t11, when the rider is thrown off the vehicle for example and releases the throttle lever, the throttle opening becomes smaller than the determination threshold value S and such state is maintained.

When the inclination angle of the vehicle exceeds the threshold value A at time t12, when the throttle opening is smaller than the threshold value S, the up-down counter is started to be incremented.

Then, at time t13, when the inclination angle of the vehicle becomes smaller than the threshold value A, the up-down counter is started to be decremented. The count value then reaches zero, and such state is maintained, as shown in FIG. 5(a).

At time t14, when the inclination angle of the vehicle again exceeds the threshold value A, increment of the up-down counter is resumed.

Then, at time t15, when the inclination angle of the vehicle becomes smaller than the threshold value A, the up-down counter is started to be decremented, but when the inclination angle of the vehicle exceeds the threshold value A at time t16, increment of the up-down counter is resumed. When increment of the up-down counter is resumed before the count value reaches zero, as shown in FIG. 5(a), and the increment continues until the cumulative duration exceeds the threshold value "a" at time t17, at least one of ignition, fuel injection, and the injection pump is stopped to stop the engine.

Next, description will be made of the operation of the second preferred embodiment of the engine control system according to the present invention described above at the time of detecting the overturning of the vehicle, with reference to a time chart of FIG. 5(b).

Figure 5B:
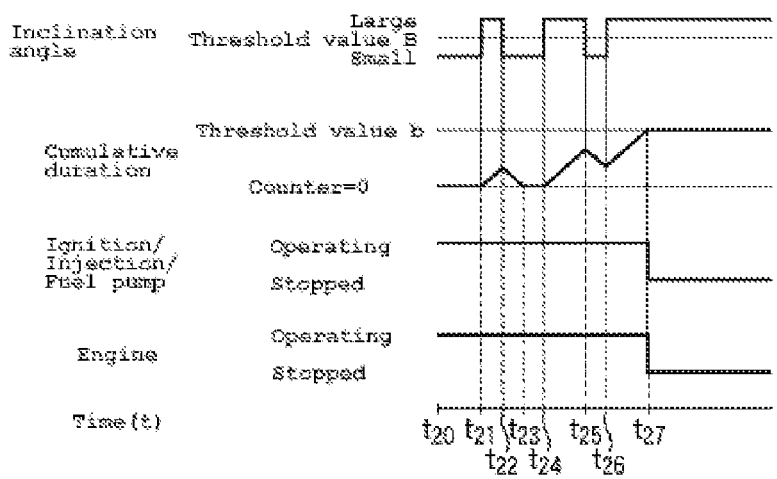

FIG. 5(b) shows inclination angles of the vehicle relative to the horizontal plane, count values of the up-down counter of cumulative duration, the states of ignition, fuel injection and the injection pump, and the states of the engine, with a lapse of time on a horizontal axis.

At time t21, when the inclination angle of the vehicle exceeds the threshold value B, the up-down counter is started to be incremented.

Then, at time t22, when the inclination angle of the vehicle becomes smaller than the threshold value B, the up-down counter is started to be decremented. The count value then reaches zero at time t23, and such state is maintained, as shown in FIG. 5(b).

At time t24, when the inclination angle of the vehicle again exceeds the threshold value B, increment of the up-down counter is resumed.

Then, at time t25, when the inclination angle of the vehicle becomes smaller than the threshold value B, the up-down counter is started to be decremented, but when the inclination angle of the vehicle exceeds the threshold value B at time t26, increment of the up-down counter is resumed. When increment of the up-down counter is resumed before the count value reaches zero, as shown in FIG. 5(b), and the increment continues until the cumulative duration exceeds the threshold value "b" at time t27, at least one of ignition, fuel injection, and the injection pump is stopped to stop the engine.

As described above, in the engine control system of the present invention, the first preferred embodiment can be practiced in combination with the second preferred embodiment. Thus, when the vehicle exceeds the second cumulative duration of inclination, the engine is stopped with or without rider's operation.

In various preferred embodiments of the present invention, the up-down counter is used to detect the first and second cumulative durations, and a configuration is adopted such that when the inclination angle of the vehicle becomes smaller than the threshold value, the counter is decremented, and when the inclination angle of the vehicle again exceeds the determination threshold value, the counter is again incremented from the decremented count value.

It is also possible to configure a preferred embodiment of the present invention such that when the inclination angle of the vehicle becomes smaller than the threshold value, the counter is reset and then incremented from its default value, instead of configuring such that when the inclination angle of the vehicle becomes smaller than the threshold vale of the vehicle becomes smaller than the threshold value, the counter is decremented, and when the inclination angle of the vehicle again exceeds the threshold value, the counter is incremented from the decremented count value.

The present invention includes a vehicle inclination detector arranged to detect that the inclination angle of the vehicle is maintained at an angle greater than a predetermined angle during a predetermined time, and a rider's operation detector arranged to detect whether the rider is operating the vehicle by his/her will. The vehicle inclination detector and the rider's operation detector allow for accurate detection of overturning of the vehicle so that at least one of ignition of the engine, fuel injection, and the fuel pump is stopped to stop the engine of the vehicle. More specifically, the overturning of the vehicle is determined based on at least one of the throttle opening sensor, pressure within the intake pipe, braking, and braking and shifting of the vehicle, controlled by the rider's will. This allows correct determination of the overturning of the vehicle, and the present invention thereby provides many significant advantages.

While the present invention has been described with respect to preferred embodiments thereof, it will be apparent to those skilled in the art that the disclosed invention may be modified in numerous ways and may assume many embodiments other than those specifically set out and described above. In addition, various features of the preferred embodiments described above can be combined as desired. Accordingly, it is intended by the appended claims to cover all modifications of the present invention that fall within the true spirit and scope of the present invention.

What is claimed is:

1. An engine control system comprising:
   a vehicle inclination angle detector arranged to detect an inclination of a vehicle relative to a horizontal plane;
   a cumulative-duration-of-inclination detector arranged to detect a cumulative duration for which the inclination angle detected by the vehicle inclination angle detector is greater than a predetermined angle;
   a rider's operation detector arranged to detect whether or not a rider is operating the vehicle; and
   an engine cut off device arranged to stop an engine of the vehicle when an overturning of the vehicle has been determined based on an output of the cumulative-duration-of-inclination detector and an output of the rider's operation detector; wherein
   the rider's operation detector detects at least one of throttle opening, pressure within an intake pipe, braking, or braking and shifting of the vehicle responsive to rider's operation; and
   the output of the rider's operation detector includes an output of the at least one of the throttle opening, the pressure within an intake pipe, the braking, and the braking and shifting of the vehicle detected by the rider's operation detector.

2. The engine control system according to claim 1, wherein the cumulative-duration-of-inclination detector includes an up-down counter that is incremented when the inclination angle detected by the vehicle inclination angle detector is greater than a predetermined angle, and is decremented when the inclination angle detected by the vehicle inclination angle detector is smaller than the predetermined angle.

3. The engine control system according to claim 1, wherein the engine cutoff device stops at least one of ignition of the engine, fuel injection, and a fuel pump.

4. A vehicle comprising the engine control system according to claim 1.

5. An engine control system comprising:
   a vehicle inclination angle detector arranged to detect an inclination of a vehicle relative to a horizontal plane;
   a first cumulative-duration-of-inclination detector arranged to detect a first cumulative duration for which the inclination angle detected by the vehicle inclination angle detector is greater than a predetermined angle;

a second cumulative-duration-of-inclination detector arranged to detect a second cumulative duration that is set to be longer than the first cumulative duration;

a rider's operation detector arranged to detect whether or not a rider is operating the vehicle;

a first engine cutoff device arranged to stop an engine of the vehicle when an overturning of the vehicle has been determined based on an output of the first cumulative-duration-of-inclination detector and an output of the rider's operation detector; and a second engine cutoff device arranged to stop the engine of the vehicle when an overturning of the vehicle has been determined based on an output of the second cumulative-duration-of-inclination detector.

6. The engine control system according to claim 5, wherein the first and second cumulative-duration-of-inclination detectors include an up-down counter that is incremented when the inclination angle detected by the vehicle inclination angle detector is greater than a predetermined angle, and is decremented when the inclination angle detected by the vehicle inclination angle detector is smaller than the predetermined angle.

7. The engine control system according to claim 5, wherein the rider's operation detector detects at least one of throttle opening, pressure within an intake pipe, braking, or braking and shifting of the vehicle responsive to rider's operation.

8. The engine control system according to claim 5, wherein the first and second engine cutoff devices stop at least one of ignition of the engine, fuel injection, and a fuel pump.

9. A vehicle comprising the engine control system according to claim 5.

10. An engine control method comprising the steps of:
detecting an inclination angle of a vehicle;
detecting a cumulative duration for which the inclination angle is greater than a predetermined angle;
detecting whether or not a rider is operating the vehicle; and
stopping an engine of the vehicle when an overturning of the vehicle has been determined based on an output indicating the cumulative duration and an output indicating whether or not the rider is operating the vehicle; wherein
the step of detecting whether or not a rider is operating the vehicle includes detecting at least one of throttle opening, pressure within an intake pipe, braking, or braking and shifting of the vehicle responsive to rider's operation; and
in the step of stopping the engine of the vehicle, the output indicating whether or not the rider is operating the vehicle includes an output of the at least one of the throttle opening, the pressure within an intake pipe, the braking, and the braking and shifting of the vehicle detected in the step of detecting whether or not the rider is operating the vehicle.

11. The engine control method according to claim 10, wherein the steps of detecting the cumulative duration includes incrementing an up-down counter when the inclination angle of the vehicle is greater than the predetermined angle and decrementing the up-down counter when the inclination angle of the vehicle is smaller than the predetermined angle.

12. The engine control method according to claim 10, wherein the step of stopping the engine of the vehicle includes stopping at least one of ignition of the engine, fuel injection, and a fuel pump.

13. A computer-readable medium storing an engine control program for a vehicle that is executable by a general purpose computer to perform the steps of the method according to claim 10.

14. An engine control method comprising the steps of:
detecting an inclination angle of a vehicle;
detecting a first cumulative duration for which the inclination angle is greater than a predetermined angle;
detecting a second cumulative duration for which the inclination angle is greater than a predetermined angle and that is set to be longer than the first cumulative duration;
detecting whether or not a rider is operating the vehicle;
stopping an engine of the vehicle when an overturning of the vehicle has been determined based on the first cumulative duration and an output indicating whether the rider is operating the vehicle; and
stopping the engine of the vehicle when an overturning of the vehicle has been detected based on an output indicating the second cumulative duration of inclination.

15. The engine control method according to claim 14, wherein the steps of detecting the first and second cumulative durations include incrementing an up-down counter when the inclination angle of the vehicle is greater than the predetermined angle and decrementing the up-down counter when the inclination angle of the vehicle is smaller than the predetermined angle.

16. The engine control method according to claim 14, wherein the step of detecting whether or not a rider is operating the vehicle includes detecting at least one of throttle opening, pressure within an intake pipe, braking, or braking and shifting of the vehicle responsive to rider's operation.

17. The engine control method according to claim 14, wherein the step of stopping the engine of the vehicle includes stopping at least one of ignition of the engine, fuel injection, and a fuel pump.

18. A computer-readable medium storing an engine control program for a vehicle that is executable by a general purpose computer to perform the steps of the method according to claim 14.

* * * * *